US005706282A

United States Patent [19]
Chung

[11] Patent Number: 5,706,282
[45] Date of Patent: Jan. 6, 1998

[54] ASYMMETRIC SPEECH CODING FOR A DIGITAL CELLULAR COMMUNICATIONS SYSTEM

[75] Inventor: Min I. Chung, Princeton Junction, N.J.

[73] Assignee: Lucent Technologies Inc., Murray Hill, N.J.

[21] Appl. No.: 345,148

[22] Filed: Nov. 28, 1994

[51] Int. Cl.$^6$ .................................................. H04L 5/14
[52] U.S. Cl. ...................... 370/280; 379/59; 375/219; 375/225; 375/240
[58] Field of Search ........................... 375/219, 225, 375/240, 242, 296, 346, 224; 370/32, 80, 81, 29, 282, 435, 433, 280; 455/33.1; 379/58, 59, 63

[56] References Cited

U.S. PATENT DOCUMENTS

| | | | |
|---|---|---|---|
| 4,352,182 | 9/1982 | Billi et al. | 371/22 |
| 5,253,269 | 10/1993 | Gerson et al. | 375/28 |
| 5,289,501 | 2/1994 | Seshadri et al. | 375/17 |
| 5,327,520 | 7/1994 | Chen | 395/2.28 |
| 5,353,374 | 10/1994 | Wilson et al. | 395/2.35 |
| 5,353,376 | 10/1994 | Oh et al. | 395/2.42 |
| 5,517,492 | 5/1996 | Spear | 370/29 |
| 5,557,639 | 9/1996 | Heikkila et al. | 375/224 |

Primary Examiner—Wellington Chin
Assistant Examiner—Jean B. Corrielus

[57] ABSTRACT

A digital cellular communication system provides an asymmetric speech coder for improving audio quality in the uplink channel. A high rate speech coder is provided in the uplink of the digital cellular communication system to improve the audio quality. To compensate for the higher band width consumed by this high rate speech coder, the uplink uses a channel code, such as a convolutional code, that generates fewer symbols per each input bit, thereby consuming less bandwidth. The loss of coding gain as a result of the change in the convolutional code is compensated for by applying a special power control strategy. The power control strategy increases the transmit power for transceivers using the asymmetric speech coder.

11 Claims, 2 Drawing Sheets

ASYMMETRIC SPEECH CODING FOR A DIGITAL CELLULAR COMMUNICATIONS SYSTEM

BACKGROUND OF THE INVENTION

1. Field of the Invention

The present invention relates generally to cellular communications systems, and more specifically to a system and method for improving speech quality of digital cellular communications systems.

2. Related Art

The cellular communications industry has enjoyed booming growth over the past several years. Numerous individuals in business and industry, as well as in the private sector, have turned to cellular communications to serve many of their communications needs. However, as with any communications service, the most important factors to the customers tend to be cost, quality, and reliability.

Cost is, at least to some extent, driven by the number of users that can simultaneously access a communications channel. If more system capacity is available, the cost of that capacity can be spread over a greater number of users. Thus, one goal in designing a cellular communications system is to maximize the system capacity.

It is a goal of cellular service providers to maximize system capacity while maintaining an acceptable level of speech quality. For example, in a direct sequence CDMA (code division multiple access) system, maximum capacity is achieved when the ratio Eb/Nt (energy per information bit to total noise power spectral density) is minimized. Therefore, for every user Eb/Nt is selected at the minimum needed to support acceptable channel performance. Because the noise power spectral density, Nt, is generated primary by the interference of other users, all signals must arrive at the CDMA receiver at or near the same level of power. This is achieved in the mobile propagation environment by providing dynamic power control for the mobile station transmitter. That is the cellular system base station controls dynamically the power of the mobile transmitters to minimize the interference on the uplink (reverse link).

In an effort to increase the capacity of cellular communications, cellular service providers typically provide speech coding. The goal of speech coding is to represent speech in digital form with as few bits as possible while attempting to maintain a high level of quality. At higher bit rates, achieving good quality is relatively easy. However, as bit rates are lowered, the problem becomes increasingly challenging. In particular, the audio quality degrades significantly in a noisy environment. Although higher bit-rate coding provides higher speech quality, it also consumes more bandwidth. Thus, this has the effect of raising the cost of the service.

The Cellular Telecommunications Industry Association (CTIA) adopted a standard for TDMA (Time Division Multiple Access) digital cellular mobile radio in the United States. This standard is an 8 kilobit/second (kbps), standard using a vector sum excited linear prediction (VSELP) speech coder, which is an analysis-by-synthesis predictive coder. This coder has long- and short-term predictors, and calculates coder parameters based on frames of input data. Another standard, this one for CDMA, uses code-excited linear prediction (CELP), which can also be implemented as an analysis-by-synthesis predictive coder. It is common in the cellular communications industry to use an 8 kbps CELP speech coder for both the uplink and downlink signal paths.

Also common in the cellular communications industry is to combine the 8 kbps CELP speech coder with a channel code. The channel code, often a convolutional code, improves the bit-error rate (BER) of the channel. A (k,n) convolutional code accepts n binary symbols at its input and produces k binary symbols at its output. A conventional CDMA cellular system uses a (2,1) code for downlink transmissions, and a (3,1) code for uplink. A conventional TDMA cellular system uses a (2,1) code for both downlink and uplink.

SUMMARY OF THE INVENTION

The present invention provides asymmetric speech coding for digital cellular communications systems. According to the invention, a higher rate speech coder is provided on the uplink, which is the weakest link in terms of audio quality. This higher coding rate for the uplink results in an increase in the quality of the uplink audio. The downlink coding rate is not increased, resulting in asymmetric speech coding. Thus, asymmetric speech coding can be provided to users as requested. Cellular transceivers operating with the asymmetric speech coding are referred to as asymmetric-speech-coder transceivers.

As a result of the higher rate speech coder, system capacity for the uplink of a CDMA system is impacted by the speech coder. To compensate for this increased bandwidth consumption, the level of error control coding is reduced. For example, for a digital CDMA system which normally uses a rate ⅓ convolutional code, the convolutional code is switched to a rate ½. This results in two-thirds the number symbols being transmitted on the system uplink. As a result, the bandwidth consumption increase brought about by the increase in the speech coding rate is offset.

To accommodate the loss in coding gain as a result of switching to a higher rate convolutional code, the transmitter RF power is increased. That is, instead of using the same power control process used in conventional CDMA cellular systems and attempting to arrive with the same power level at the base station for each transmitter, the transmit power of the asymmetric-speech-coder transceiver is purposely increased. In this manner, the signal of the asymmetric-speech-coder transceiver arrives at the base station at a power level that is higher than that of other (symmetric) transceivers.

One advantage of the present invention is that the enhanced level of quality can be provided to the users on an as-requested basis. Thus, if a particular user desires a higher-quality communication link, that user can be provided with an asymmetric-speech-coder transceiver that employs the higher speech coding rate and a higher convolutional code rate.

A benefit of this feature is that the higher quality service can be restricted to only those users paying for such service. Thus, the impact on capacity of a CDMA system can be controlled because the availability of the higher rate uplink coder is limited to those willing to pay for this impact. With the proper pricing structure in place, any impact on the system capacity will not result in an increased cost to other users.

Another advantage of the invention is that for periods of time where there are no users using the asymmetric speech coding, the system capacity of a CDMA system is maintained. The system capacity is only impacted when a user using asymmetric speech coding is present on a CDMA system. Thus, the system capacity is dynamically changed as users with asymmetric speech coders access the link. Thus, in a CDMA system, an advantage of the asymmetric speech coder over a symmetric speech coder is that it enables more efficient usage of system capacity.

Another advantage is that the power of each transceiver can still be controlled by the service provider, thus allowing the provider to maintain control over the communications system. In this manner, the provider can take steps to minimize the impact of the increased-power users. The provider also has the control necessary over the power to control the resultant decrease in channel capacity.

A further advantage of the invention is that it allows an improvement in audio quality to be implemented with a minimum impact to the digital cellular communications system. The invention can be implemented in TDMA and CDMA systems with a minimal change for the base station and the mobile terminals. Therefore, a timely and relatively low cost implementation can be achieved while still providing an improved level of service.

An advantage for TDMA systems of an asymmetric speech coder over symmetric higher rate speech coding is the consideration of unbalanced RF interference between the uplink and downlink. Furthermore, with an asymmetric speech coder, the audio quality of the uplink can be improved without impacting system capacity.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE EMBODIMENTS

1. Overview of the Invention

The present invention is directed toward a system and method for improving the quality of speech in digital cellular systems by implementing an asymmetric speech encoding scheme. According to the invention, the rate of the speech coder used in the uplink is increased to increase the quality of the audio communications in this link. To compensate for this increased rate, the rate of the convolution code is decreased to keep the bandwidth the same. The resultant loss in coding gain is compensated for by increasing the uplink transmitted RF power. To maximize available bandwidth on the downlink, the speech coder rate on the downlink is maintained without increase. Thus, the speech coding schema implemented is asymmetric.

In this document, the term "asymmetric-speech-coder transceiver" is used to describe a cellular transceiver that incorporates this higher rate speech coder on the uplink while maintaining the downlink speech coder at the original, lower rate.

2. Example Environment

Figure 1:
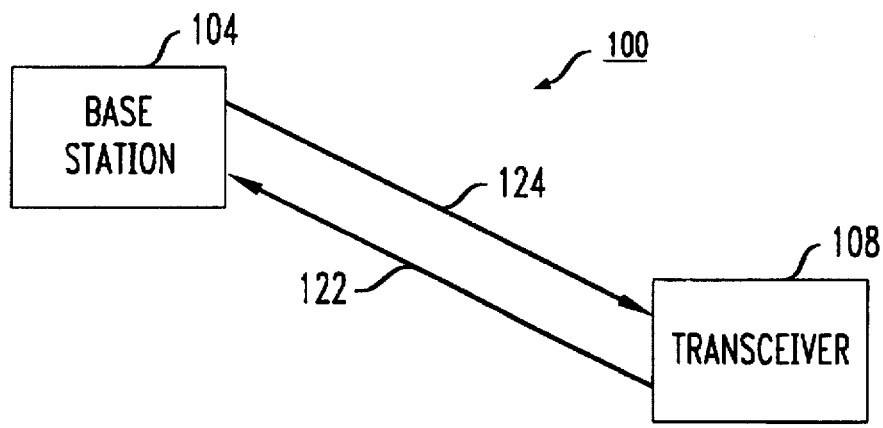
FIG. 1 is a block diagram illustrating a digital cellular communications system.

The invention is intended to improve the quality of digital cellular communications. Thus, the general environment of the invention is a digital CDMA (code division multiple access) cellular communications system. A representative cellular communications system 100 is depicted in FIG. 1. This system 100 includes a base station 104 and one or more transceivers 108. Base station 104 represents the equipment provided by a cellular service provider and used to provide cellular communications services to the provider's clients. Thus, base station 104 generally represents the cellular service provider's communications equipment. This equipment can include, but is not limited to, one or more communications satellites to relay cellular traffic, earth terminals for tracking and controlling the satellites, and earth-based communications relay facilities.

Transceiver 108 generally represents a cellular telephone. Examples of transceiver 108 include, but are not limited to, mobile or portable cellular telephones, fixed-location cellular phones, and other cellular transceivers. The transceivers can be used to communicate voice, modem, facsimile and other data. The data communicated via the cellular system 100 is generally referred to in this document as "user communications."

In operation, base station 104 interfaces transceiver 108 with another transceiver 108 or with another telephone or other transceiver, so that information can be communicated. Transceiver 108 sends its signals to base station 104 via a data channel referred to as an uplink 122. These signals can include, but are not limited to, the users communications and control signals. Transceiver 108 receives, via a downlink data channel (referred to as downlink 124), user communications and control data from base station 104.

The present invention is described in terms of this example environment of a generic digital cellular communications system. Description in these terms is provided for convenience only. It is not intended that the invention be limited to application in this example environment. In fact, after reading the following description, it will become apparent to a person skilled in the relevant art how to implement the invention in alternative environments.

In fact, the present invention can easily be implemented in a TDMA cellular system. For one example of a TDMA cellular system, consider a 30-kilohertz (Khz) channel divided into six (6) timeslots and shared among three (3) users. For downlink transmissions, base station 104 typically maintains the same power level for all three users. The power level can be determined by the maximum power or determined by the user that is farthest away from base station 104.

For uplink transmissions, to extend the battery life of transceiver 108, each transceiver transmits a different power as instructed by base station 104. The greater the distance between transceiver 108 and base station 104, the higher the power in the uplink. As a result, there is an RF power and interference unbalance created between downlink 124 and uplink 122. The extra interference budget in uplink 122 can be used by asymmetric speech coder users. Because of this, the TDMA cellular system can improve audio quality for some asymmetric speech coder users at little or no impact on system capacity and system planning (e.g., cell size, frequency coordination, etc.).

3. The Invention in terms of the Example Environment

To improve voice quality of digital cellular communications system 100, voice coding techniques for the uplink and downlink communications are employed. One common approach is to use an 8 kbps (kilobits per second) CELP (code-excited linear prediction) speech coder for both the uplink 122 and the downlink 124.

To improve the bit-error rate (BER) of the channel, the encoded data are convolutionally coded using a (k,n) convolutional code. The (k,n) convolutional code accepts n binary symbols at its input and produces k binary symbols at its output. A conventional cellular system uses a (2,1) code on downlink 124, and a (3,1) code on uplink 122.

To limit the amount of interference generated by a transceiver 108, its power is limited. In most systems, base station 104 controls a transceiver's power by sending commands to that transceiver 108 via downlink 124. With lower power of transceivers 108, destructive interference among transceivers 108 is minimized. Therefore, as transceiver power is reduced, more transceivers 108 can generally share the available bandwidth of the communications channel. Thus as power is reduced, the system capacity is increased. However, the cost of this increase is a degradation in the signals across the channel. Thus, as power is decreased, the BER typically increases.

It would be desirable to increase the rate of the speech coder to a rate above 8 kbps to improve the voice quality. However, as the rate is increased, the number of users the channel can support at a given time (i.e., system capacity) decreases. Because the profitability of the system is based on the number of users, there is a cost/benefit tradeoff between high audio quality and low access charges.

In an endeavor to maximize the benefits while minimizing the costs, the inventor has discovered that most of the degradation in audio quality is introduced in uplink 122, and a relatively small amount of degradation is introduced in downlink 124. Thus, the invention provides an asymmetric speech encoder that treats uplink 122 different from downlink 124.

There are several situations that contribute to an increased degradation in audio quality in uplink 122 as compared to downlink 124. In a majority of the cellular communication uses, a cellular telephone user is communicating with a conventional telephone user. In such an environment, the conventional telephone user is typically in a quiet, ambient environment with less background noise to degrade the audio quality. This is the signal that is provided to the base station 104 for downlink to transceiver 108. Thus, by its very nature, the downlink is typically quieter.

On the other hand, the cellular user is typically in a noisy environment, such as the automobile, and more noise is introduced into the audio signal. Furthermore, because of this noisy environment, the cellular user is less sensitive to downlink audio quality. As still a further consideration, base station 104 can put more processing power (e.g., a high performance DSP chip, higher dynamic range) to implement a better speech encoder with little audio quality degradation. On the other hand, due to constraints placed on the cost and the battery life for transceivers 108, the speech encoder is often implemented at a minimum processing power and dynamic range at the cost of audio quality.

As stated above, to compensate for the unbalanced ambient environment and the unbalanced processing power of the uplink and downlink an asymmetric speech coder is provided that provides a higher rate speech coder in uplink 122 than provided in downlink 124. This is a clear advantage over a symmetric higher rate speech coder. In a symmetric higher rate speech coder, the downlink also uses the higher rate speech coder that is provided to the uplink. This provides very little benefit to a mobile user in a noisy ambient environment, especially where high performance digital signal processing techniques are used at the base station 104.

Where an asymmetric speech coder is implemented in a CDMA system, the extra interference budget from downlink 124 can be used to implement a broadcast data channel for all users in the same cell. This broadcast data channel can be used to send e-mail, traffic information, stock market information, etc. This broadcast data channel can also serve as a downlink 124 for packet data in a CDMA digital cellular system.

To improve the audio quality of digital cellular communications system 100, the invention implements a high rate speech coder in the uplink 122. In one embodiment, a 13 kbps speech encoder is implemented. However, the increase to 13 kbps results in a consumption of approximately 50% more bandwidth than was consumed with the standard 8 kbps encoder. Thus, the capacity of the channel is decreased.

To compensate for the decreased capacity, the invention uses a (2,1) convolution code on uplink 122 in place of the (3,1) code. This results 50% fewer output symbols generated for each input symbol (two output symbols are generated instead of three for each input bit). Thus, the use of a (2,1) code offsets the increased bandwidth introduced by the 13 kbps code. Unfortunately, switching to a (2,1) code results in a higher BER.

This loss of coding gain is compensated for by increasing the transmitted RF power from transceiver 108 to base station 104. Thus, the uplink signal from asymmetric-speech-coder transceivers 108 arrives at the base station 104 at power level that is higher than that of the signals from other (symmetric) users.

One reason conventional digital cellular communications systems 100 do not implement the higher rate speech coding is because it consumes additional bandwidth. As described above, the inventor have overcome this problem by providing the convolutional coding at a rate to compensate for the higher rate of the speech coder, and the decrease in coding is compensated for by an increase in transmitter power. The inventor have also limited the application of the higher rate speech coder to the uplink 122, where they have discovered it is needed most. As a result of this asymmetric coding scheme, the quality of service is improved without affecting downlink capacity.

Figure 2:
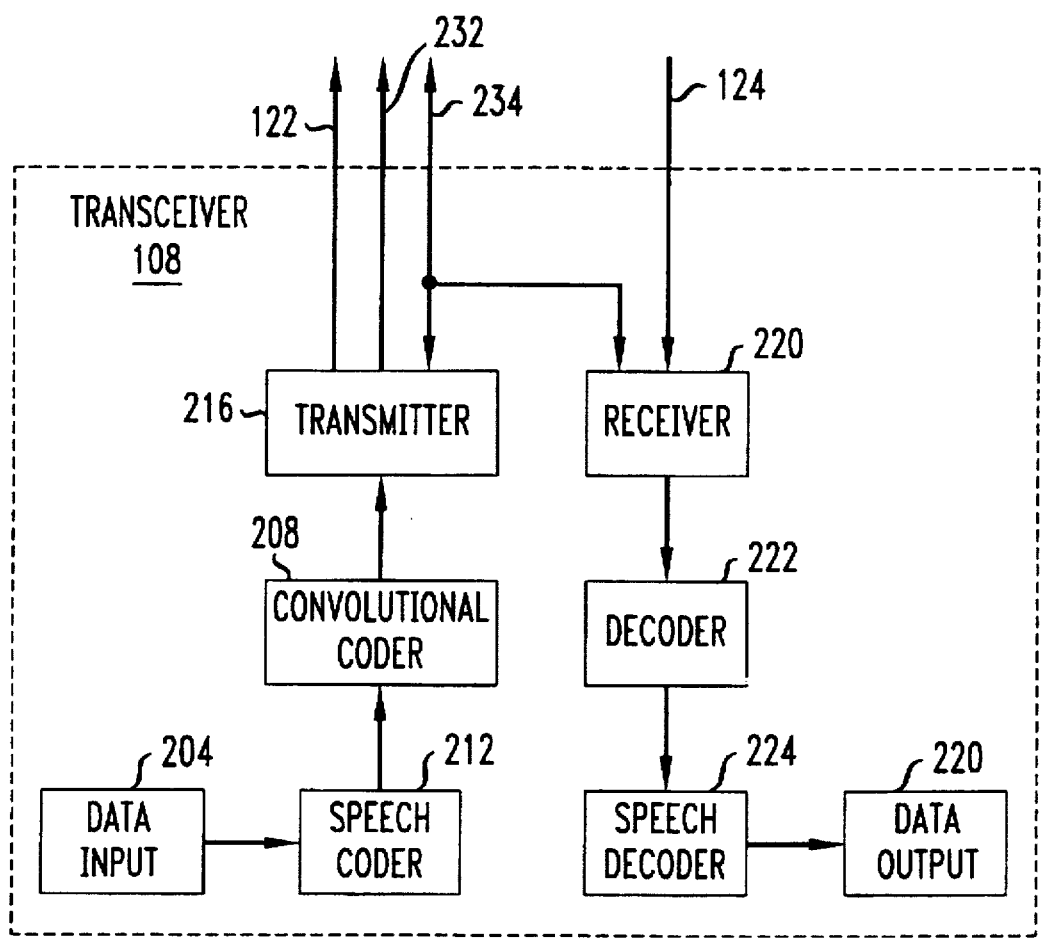
FIG. 2 is a block diagram illustrating a representative architecture of a cellular transceiver according to one embodiment of the invention.

FIG. 2 is a block diagram illustrating a transceiver 108 according to one embodiment of the invention. FIG. 2 illustrates a representative architecture of transceiver 108. After reading the following description, it will become apparent to a person skilled in the relevant art how to implement transceiver 108 using alternative configurations and/or architectures. In one embodiment, transceiver 108 is a CDMA transceiver.

Transceiver 108 includes a data input module 204, a convolutional coder 208, a speech coder 212, and a transmitter 216. Data input module 204 receives input data from a user. For example, data input module 204 could receive voice data from a person speaking on a telephone, or can receive fax data from a facsimile machine, or, data input module could receive data from numerous other like sources. If the received data is analog (e.g., speech), data input module 204 performs an analog-to-digital conversion to digitize the input data. Data input module 204 can also perform other data formatting as may be desired for transmission of the data using digital cellular communications system 100. The digital data are forwarded to speech coder 212 to enhance the audio quality. As stated above, in a preferred embodiment, speech coder 212 is a 13 kbps speech coder. From speech coder 212, the data are forwarded to convolutional coder 208 where a rate 1/K convolutional code is applied to the data. As stated above, in the preferred embodiment, the convolutional code is a rate ½ convolutional code, which is an increased code rate over the standard rate ⅓ convolutional code.

Once the data are convolutionally encoded, they are forwarded to transmitter 216 for transmission across uplink 122. Transmitter 216 provides the RF modulation necessary for such transmission.

Transceiver 108 also includes a speech decoder 224 to decode speech coded user communications received via downlink 124. Conventional transceivers 108 utilize the 8 kbps standard CELP decoder. The rate of speech coding on downlink 124 is unchanged according to the invention. This is because maximum gains are obtained by enhancing the uplink 122 portion of the system.

Uplink 122 is illustrated in FIG. 2 as having two components: uplink data path 232, and uplink control path 234. It is across uplink data path 232 that the input data travels to base station 104 for forwarding to the recipient. Control path 234 is used by base station 104 and transceiver 108 to exchange certain control information. It is by control path 234 that base station 104 controls the transmitter power of transceiver 108. Thus, signals received from base station 104 are used to increase or decrease the power of transmitter 216. As stated above, an increase in transmitter power results in greater interference on uplink 122, resulting in a limitation on the number of users that can simultaneously access the channel. Conversely, a decrease in transmitter power results in decreased interference, and hence, additional users can access the channel.

Thus, in accordance with a preferred embodiment of the invention, base station 104 monitors and adjusts transmitter power of transceiver 108 to optimize the channel bandwidth. Thus, the effects of increased transmitter power as a result of the higher rate speech coder (and higher rate convolutional coder) can be minimized to obtain optimum system performance. Further, because the power of each user can be controlled, the capacity of a channel can be decreased in a controlled manner. This provides digital cellular communications system 100 with flexibility and control over the system bandwidth.

Figure 3:
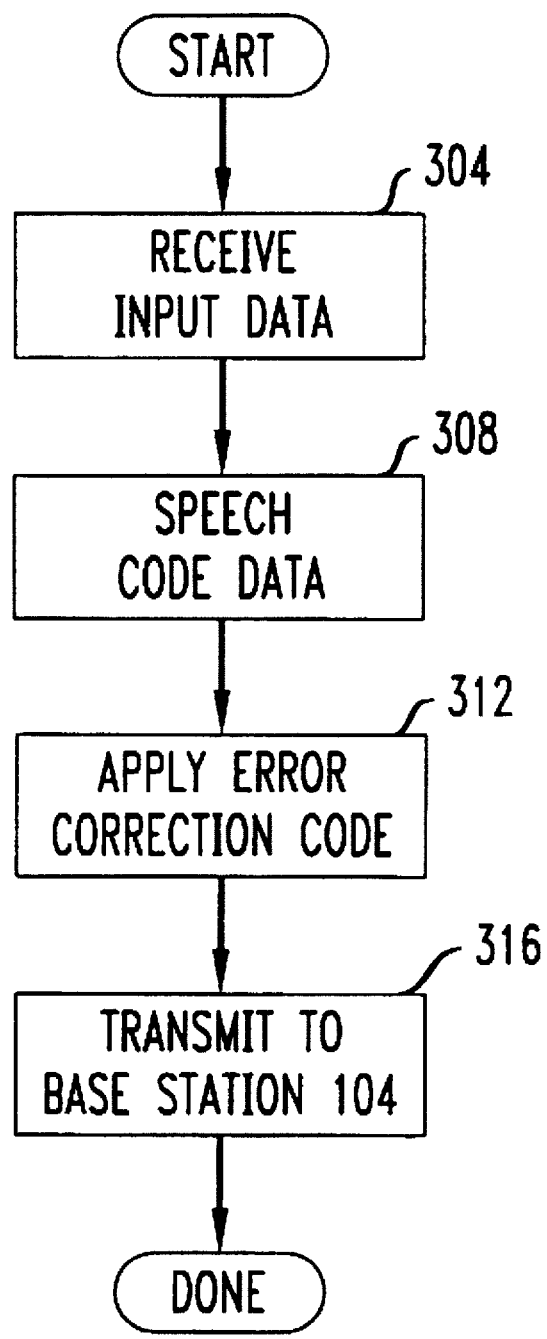
FIG. 3 is an operational flow diagram illustrating the operation of the transceiver depicted in FIG. 2 according to one embodiment of the invention.

FIG. 3 is an operational flowchart illustrating the operation of the invention according to one embodiment. In a step 304, transceiver 108 receives input data. If the input data are analog, they are digitized to form digital data. The digital data are then forwarded to speech coder 212.

In a step 308, speech coder 212 performs a speech coding on the data. To improve the audio quality of the digital cellular communications system 100, speech coder 212 performs this coding at a higher rate than would otherwise be provided. For example, a conventional standard uses an 8 kbps CELP speech coder. In this example, speech coder 212, according to the invention, is increased to a 13 KBPS speech coder for the uplink 122. This results in higher quality audio, but consumes a greater bandwidth than the 8 kbps CELP speech coder. The speech coded data are then forwarded to convolutional coder 208.

In a step 312, convolutional coder 208 applies an error correcting code to the data to allow errors to be minimized across the link. According to the invention, a higher rate convolutional code is employed so that fewer symbols per bit are generated. This results in transceiver 108 requiring less bandwidth to transmit the data across uplink 122. In the example above where the 8 kbps speech rate is increased to 13 kbps, the rate ⅓ convolutional code is replaced with a rate ½ code. Increases in the bandwidth consumption due to the higher rate speech coder are offset by using a higher rate convolutional code that generates fewer symbols per input bit.

In a step 316, the data are transmitted across uplink 122 to base station 104. This transmission occurs at an increased RF power to compensate for the loss of coding gain introduced by the higher rate convolutional coding.

As indicated above, a significant difference of the asymmetric speech coding over conventional systems is that asymmetric-speech-coded transmissions arrive at base station 104 at a power level that is higher than that of the signals from other users. With conventional symmetric systems, each transceiver 108 estimates its own transmitter power. A correction to this estimated power is supplied by base station 104 to adjust the actual transmitted power. Thus, in conventional systems, all transceivers 108 use the same process and the signal from each transceiver reaches base station 104 at approximately the same power level.

To reduce residual errors, each transceiver 108 corrects its transmit power with information supplied by base station 104 via low-rate data inserted into the downlink 124. Base station 104 derives this correction information by monitoring the uplink channel quality of each mobile station, comparing this measurement to a threshold, and requesting an increase or decrease in power depending on the result. In this manner, base station 104 maintains each uplink 122, and thus all uplinks 122 at the minimum power necessary to provide acceptable performance.

According to the invention, the power level of asymmetric transmissions arrives at base station 104 at a rate higher than that of symmetric transmissions. The power level for all symmetric transmissions can be controlled in the same manner as that described for conventional systems, allowing system capacity to be maximized when no asymmetric transmissions are present. When an asymmetric transmission is present, that user's power can be controlled in a similar fashion, but around an increased baseline. The increase in the asymmetric user's power is controlled to a level needed to obtain acceptable performance.

In one embodiment of the invention, the user is given the option of signing up for the higher level of service at the time the service agreement is implemented. In this embodiment, the user is always provided with the higher level of service every time he or she uses his or her transceiver 108. Thus, this user's transceiver (having asymmetric speech coding) always transmits to base station 104 such that its signal reaches base station 103 at a power level that is higher that of other (symmetric) users.

In a second embodiment, a user can select the higher quality service at the time such service is desired. In other words, the higher level of service can be selected on a per-call basis. Thus, if a user is placing an important call, that user can request the higher level of service. A technique for implementing the higher level of service on a per-call basis can be implemented in numerous ways. For example, the system can be set up such that the user simply enters a key sequence when requesting the higher level of service. In another example, the system can be implemented such that the user selects the higher level of service by a switch located on transceiver 108. In either case, transceiver 108 is provided with selectable uplink speech coding such that asymmetric speech coding can be implemented.

An advantage of providing the higher level of service on a per call basis is that additional system capacity is not consumed each time the user places a call. Instead, the additional bandwidth is consumed only when a user selects the higher level of service. In this second embodiment, when the higher level of service is selected, the transceiver 108 performs the appropriate speech coding and convolutional coding, and the base station 104 sets up the transmitter power at the appropriate level. This provides additional flexibility in controlling the digital cellular communications system.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A cellular transceiver, for providing enhanced audio quality cellular communications, comprising:

speech decoder means for decoding downlink user communications coded with a speech code at a first rate; and speech coder means for coding uplink user communications with a speech code at a second rate that is higher than said first rate;

wherein the second rate of said uplink speech coder results in enhanced quality audio communications while not impacting bandwidth consumption of the downlink.

2. The cellular transceiver of claim 1, further comprising: means for convolutionally coding user communications at a rate that is selected to compensate for the difference between said first and second rates; and means for transmitting said speech coded, convolutionally coded user communications at an increased power level to compensate for lost coding gain resulting from said altered convolutional coding rate.

3. The cellular transceiver of claim 2, further comprising:

means for receiving user communications from a user; and means for digitizing said user communications prior to speech coding.

4. The cellular transceiver of claim 2, further comprising:

means for receiving control signals to control said power level to optimize channel capacity.

5. The cellular transceiver of claim 1, further comprising data output means for providing downlink user communications to a user of the transceiver.

6. The cellular transceiver of claim 1, wherein said second rate is 13 kbps.

7. The cellular transceiver of claim 6, wherein said first rate is 8 kbps.

8. The cellular transceiver of claim 2, wherein said first rate is 8 kbps, said second rate is 13 kbps, said convolutional code rate is ½ and said power level is increased by 0.5 dB.

9. The cellular transceiver of claim 1, further comprising:

receiver means for receiving said downlink user communications;

decoder means for decoding downlink user communications coded with a convolutional code.

10. A system for providing enhanced quality digital cellular communications, comprising:

a cellular transceiver for allowing a first user to communicate with a second user via a cellular communications system;

a base station for relaying user communications between said cellular transceiver and another transceiver; and an asymmetric speech coder for providing speech coding of user communications between said cellular transceiver and said base station, said asymmetric speech coder comprising:

speech decoder means for decoding downlink user communications coded with a speech code at a first rate, and speech coder means for coding uplink user communications with a speech code at a second rate that is higher than said first rate;

wherein the second rate of said uplink speech coder results in enhanced quality audio communications while not impacting bandwidth consumption of the downlink.

11. A digital cellular communications system for providing enhanced audio quality of user communication, comprising:

a base station for relaying user communications between a first user and a second user, wherein said first user is communicating via a cellular transceiver;

an asymmetric communications channel for transferring user communications between said cellular transceiver and said base station, said asymmetric communications channel comprising:

an uplink data path for transmitting user communications from said cellular transceiver to said base station at a first speech code rate, a downlink data path for transmitting user communications from said base station to said cellular transceiver at a second speech code rate, wherein said first speech code rate is higher than said second speech code rate;

a downlink channel, employing a speech code at a first rate;

an uplink channel, employing a speech code at a second rate higher than said first rate;

means for employing a convolution code to said uplink channel, wherein a rate of said convolution code is selected to compensate for the difference between said first and second rates; and means for transmitting data on said uplink channel at an increased transmit power to compensate for said rate of said convolutional code.

* * * * *